(12) United States Patent
Gomez Ledesma et al.

(10) Patent No.: US 9,785,153 B2
(45) Date of Patent: Oct. 10, 2017

(54) FOUR-DIMENSIONAL NAVIGATION OF AN AIRCRAFT

(75) Inventors: Ramon Gomez Ledesma, Madrid (ES); David Garrido-Lopez, Madrid (ES); Luis Pedro D'Alto, Madrid (ES)

(73) Assignee: THE BOEING COMPANY, Chicago, IL (US)

( * ) Notice: Subject to any disclaimer, the term of this patent is extended or adjusted under 35 U.S.C. 154(b) by 1117 days.

(21) Appl. No.: 13/057,719

(22) PCT Filed: Jul. 24, 2009

(86) PCT No.: PCT/US2009/051749
§ 371 (c)(1),
(2), (4) Date: May 25, 2011

(87) PCT Pub. No.: WO2010/017044
PCT Pub. Date: Feb. 11, 2010

(65) Prior Publication Data
US 2011/0251740 A1  Oct. 13, 2011

(30) Foreign Application Priority Data

Aug. 5, 2008  (EP) .................................... 08380245
May 5, 2009  (EP) .................................... 09382063

(51) Int. Cl.
*G05D 1/04* (2006.01)
*G05D 1/10* (2006.01)

(52) U.S. Cl.
CPC .............. *G05D 1/101* (2013.01); *Y02T 50/84* (2013.01)

(58) Field of Classification Search
CPC .... G05D 1/0607; G01C 23/005; G01C 21/00; G01C 23/00; Y02T 50/84
See application file for complete search history.

(56) References Cited

U.S. PATENT DOCUMENTS

| | | | | |
|---|---|---|---|---|
| 4,536,843 A * | 8/1985 | Lambregts | ...................... | 701/3 |
| 4,764,872 A * | 8/1988 | Miller | .............. | 701/3 |
| 4,774,670 A * | 9/1988 | Palmieri | ......................... | 701/3 |
| 4,809,500 A * | 3/1989 | Roberts, Jr. | ............... | F02C 9/28 |
| | | | | 60/235 |
| 5,051,910 A | 9/1991 | Liden | | |
| 6,061,612 A * | 5/2000 | Sainthuile et al. | ............... | 701/7 |
| 6,393,358 B1 * | 5/2002 | Erzberger et al. | ............ | 701/120 |

(Continued)

OTHER PUBLICATIONS

European No. 08380245.4 Search Report (Feb. 10, 2009).

(Continued)

*Primary Examiner* — Khoi Tran
*Assistant Examiner* — Paul Castro
(74) *Attorney, Agent, or Firm* — Patterson + Sheridan, LLP

(57) ABSTRACT

The present invention relates to methods of controlling the flight path of an aircraft to follow as closely as possible a predetermined four-dimensional flight path, such as when flying continuous descent approaches. A method of controlling an aircraft to follow a predetermined four-dimensional flight path is provided that comprises monitoring the actual along-track position and the actual vertical position of the aircraft relative to the corresponding desired positions on the predetermined flight path. The aircraft's elevators are used to correct deviations of the along-track position and the aircraft's throttle is used to correct deviations of the vertical position.

19 Claims, 7 Drawing Sheets

(56) References Cited

U.S. PATENT DOCUMENTS

| | | | |
|---|---|---|---|
| 6,405,107 B1* | 6/2002 | Derman | 701/3 |
| 6,507,783 B2* | 1/2003 | Katayama et al. | 701/431 |
| 7,366,591 B2* | 4/2008 | Hartmann et al. | 701/4 |
| 7,650,232 B1* | 1/2010 | Paielli | 701/528 |
| 8,234,068 B1* | 7/2012 | Young et al. | 701/528 |
| 2003/0132860 A1* | 7/2003 | Feyereisen et al. | 340/973 |
| 2003/0139876 A1* | 7/2003 | Shinagawa | 701/204 |
| 2005/0283281 A1* | 12/2005 | Hartmann et al. | 701/4 |
| 2008/0215196 A1* | 9/2008 | Deker | 701/5 |
| 2008/0249674 A1* | 10/2008 | Constans | 701/14 |
| 2012/0209457 A1* | 8/2012 | Bushnell | 701/13 |
| 2014/0019034 A1* | 1/2014 | Bushnell | 701/122 |

OTHER PUBLICATIONS

European No. 09382063.7 Search Report (Jun. 18, 2010).
"Dead-Band or Hysteresis in Control-Loops Understanding Dead-Band," XP002509946, http://en.wikipedia.org/wiki/PID_controller (Jan. 13, 2009).
"Dead-Band," XP002509947, http://en.wikipedia.org/wiki/Deadband (Jan. 13, 2009).

* cited by examiner

FOUR-DIMENSIONAL NAVIGATION OF AN AIRCRAFT

BACKGROUND

Embodiments of the present invention relate to methods of controlling the flight path of an aircraft to follow as closely as possible a predetermined four-dimensional flight path. Embodiments of the present invention are particularly useful in flying continuous descent approaches.

Flight paths are generally calculated in three dimensions, i.e. altitude and lateral position. To calculate a flight path in four dimensions requires the three-dimensional position of the aircraft to be specified over a number of points in time.

The ability to fly an aircraft according to a predetermined fight path with accuracy such that its position as a function of time is predictable is becoming increasingly important in air traffic control. This would allow air traffic control to relax separations between aircraft, leading to more efficient use of air space.

Although applicable to all phases of aircraft flight, one area that could particularly benefit from an enhanced ability to fly a four-dimensional flight path is in aircraft flying continuous descent approaches into airports. Typically, aircraft will approach an airport under the guidance of air traffic controllers. The air traffic controllers are tasked with ensuring the safe arrival of aircraft at their destination, while also ensuring the capacity of the airport is maximised. The former requirement is generally met by ensuring minimum specified separations are maintained between aircraft. Air traffic control is subject to uncertainties that may act to erode the separation between aircraft such as variable winds, both in speed and direction, and different piloting practices. Nonetheless, large numbers of aircraft can operate safely confined in a relatively small space since air traffic control can correct for these uncertainties at a tactical level using radar vectoring, velocity change and/or altitude change. As a result, a typical approach to an airport will involve a stepped approach where the aircraft is cleared, to descend in steps to successively lower altitudes as other air traffic allows.

Air traffic noise around airports has important social, political, and economic consequences for airport authorities, airlines and communities. An affordable way to tackle the noise problem in the vicinity of airports is to develop new navigation procedures that reduce the number of aircraft that fly over sensitive are at low altitude with high thrust settings and/or with non-clean aerodynamic configurations (e.g. with landing gear and/or flaps deployed). Unfortunately, conventional step-down approaches act to exacerbate this problem as aircraft are held at low altitudes, where engine thrust must be sufficient to maintain level flight.

Continuous descent approaches (CDAs) are well known. These approaches see the aircraft approach an airport by descending continuously with the engines set to idle or close to idle. Clearly, continuous descent approaches are highly beneficial in terms of noise reduction as they ensure that aircraft are kept as high as possible above sensitive areas while at the same time reducing the noise production at the source through optimum use of the engine and flaps. Continuous descent approaches also benefit fuel efficiency, emission of pollutants and reduce flight time However, continuous descent approaches must be planned in detail before commencing the approach and cannot be subjected to tactical corrections to ensure safe aircraft separation like those used in conventional step-down approaches. To date this has obliged air traffic controllers to impose large spacings between aircraft to guarantee that the aircraft arrive at the airport separated by a safe distance, bearing in mind the potential for reduction in aircraft spacing as approaches are flown due to a result of wind changes and other uncertainties. Such an increase in spacing results in an undesirable reduction in airport capacity.

The capacity penalty associated with continuous descent approaches has prevented their widespread use in airports and, to date, continuous descent approaches have mostly been used at airports with low levels of air traffic or at busier airports during quiet times (e.g. at night). Thus, it is desirable to be able to fly continuous descent approaches that minimise uncertainties in the four-dimensional position history of the aircraft. This would allow air traffic controllers to reduce safely the spacing between aircraft, thus satisfying the capacity needs of modern airports.

SUMMARY

Against this background, and according to a first embodiment, the present invention may be embodied in a method of controlling an aircraft to follow a predetermined four-dimensional flight path, where the method comprises monitoring the actual along-track position and the actual vertical position of the aircraft relative to the corresponding desired positions on the predetermined flight path; using the aircraft's elevator(s) to correct deviations of the actual along-track position of the aircraft from the desired along-track position; and using the aircraft's throttle(s) to correct deviations of the actual vertical position of the aircraft from the desired vertical position by altering the throttle setting from a nominal value to an adjusted value when the actual vertical position differs from the desired vertical position by more than a threshold. This method is primarily designed to be a vertical navigation method of the aircraft automatically commanded by a flight management computer.

Such a method provides primary control of the along-track position (i.e. the ground speed). Control of the along-track position is achieved using the elevator(s) and without adjusting the throttle(s). Should the elevator adjustment lead to the vertical, position deviation exceeding the threshold, then throttle(s) is used to control the vertical position. The change in throttle setting alone is used to correct the deviation in vertical position, i.e. the elevator(s) is not commanded to correct the deviation in vertical position (although elevator changes may be commanded by other control systems).

Consequently, rather than using throttle commands to control the ground speed, the elevator(s) is used instead. This has a major benefit in that the response time of the aircraft to a change in elevator command is very much quicker than the response time of the aircraft to a change in throttle command. As a result, the actual along-track position can be constrained to follow the desired along-track position very closely.

In effect, elevator control is used to correct errors in tracking the desired along-track position by transferring the error to the vertical position. By trading kinetic energy for potential energy in this way, the accuracy of the vertical position is sacrificed to the benefit of accuracy in the along-track position.

Inaccuracies in the vertical position are corrected using throttle commands. However, rather than trying to correct errors in the vertical position continuously, small inaccuracies in the vertical position are tolerated. Instead, these small errors are monitored and may indeed stay within tolerable values of their own accord. Nonetheless, should the errors continue to grow, the throttle(s) may be used to reduce the error. This is achieved by changing the throttle setting only once the actual vertical position deviates from the desired vertical position by more than a threshold amount. In this way, the aircraft can be flown without the need for continuous or even frequent changes to the thrust setting, thereby saving wear and tear of the engine and providing fuel savings. It also provides an effective way of decoupling elevator and throttle control. It has been proven that small corrections of the throttle settings around near-idle thrust values are sufficient to ensure a reasonable vertical confinement of the trajectory.

Preferably, using the aircraft's throttle(s) to correct deviations of the actual vertical position of the aircraft comprises: increasing the throttle setting from a nominal value to a higher value when the actual vertical position fails below the desired vertical position by a first threshold, and by decreasing the throttle setting from the nominal value to a lower value when the actual vertical position rises above the desired vertical position by a second threshold. Optionally, the first and second thresholds may be offset from the nominal setting by an equal amount. Alternatively, the first threshold and/or second threshold may vary with attitude. This may be to the benefit of flight safety. For instance, the first threshold and/or the second threshold may be set to be larger at a second altitude than they are at a first, lower attitude in this way, the thresholds may be set to be larger at high altitudes where there is no potential conflict with other airways, and the thresholds may be reduced, e.g. progressively reduced at lower altitudes, which optimizes engine use.

After adjusting the throttle setting, the throttle setting may remain at the higher or lower value. While the throttle setting is in this altered state, the method may further comprise continuing to monitor the actual along-track position and the actual vertical position of the aircraft relative to the corresponding desired positions on the predetermined flight path; using the aircraft's elevator(s) to correct deviations of the actual along-track position of the aircraft from the desired along-track position; and returning the throttle setting to the nominal value once the actual vertical position of the aircraft corresponds to the desired vertical position. Consequently, the aircraft's throttle setting is merely changed once to the higher or lower setting and left in that setting until the error has been removed from the vertical position. Once the error is corrected, the throttle setting is merely returned to the nominal, value. Advantageously, this results in less frequent changes to the throttle setting.

The nominal, throttle setting may be decided beforehand in order to perform the guidance reference calculations. The nominal throttle setting is not necessarily a fixed value, but may vary along the planned flight in order to meet constraints. For instance, the nominal throttle setting may take different values for different segments of a descent in order to meet given altitude and/or speed constraints.

The altered throttle settings may be predetermined for a given aircraft or may be calculated on-the-fly. For instance, depending on current gross weight and current flight path angle error, an altered throttle setting may be calculated from the nominal throttle setting so as to ensure that the aircraft will cancel out its vertical deviation in a given amount of time assuming that conditions do not change significantly. Preferably, this calculation is limited, such that the throttle is kept within limits. For instance, a lower throttle level limit may be set as the idle engine level.

More than a pair of thresholds may be used. For example, two or more thresholds may be used either above or below the nominal setting (or both above and below), with appropriate altered throttle settings assigned for each threshold. For example, a threshold indicating a larger deviation above the desired vertical position may lead to a more reduced thrust setting than a threshold indicating a smaller deviation.

It has been found that an improvement may be made that pays particular benefit where there is a greater requirement for the tolerance in deviations in vertical position. This is because of the slow response time met with throttle commands, i.e. once a new throttle command arises, there is a delay in the engines responding to produce the thrust corresponding to the new throttle setting, and then there is a further delay in the response of the aircraft to the altered throttle setting. This slow response time can be accommodated in circumstances where there are relaxed vertical position tolerances. However, the slow response times mean that upper and lower thresholds to deviations in vertical position may be repeatedly crossed leading to an oscillatory motion of the aircraft. Although this will not lead to a lack of control, it produces undesirable numbers of throttle changes in the engines. This leads to increased wear and tear of the engines and decreased fuel economy.

According to the improvement, the method may comprise generating throttle commands based on predictions of deviations of the actual vertical position of the aircraft from be desired vertical position. For example, the method may comprise repeatedly calculating a predicted deviation in vertical position by: calculating the current deviation of actual vertical position from the desired vertical position, calculating the rate of change of the deviation in vertical position, multiplying the rate of change by a prediction time span, and adding the so-multiplied rate of change to the current deviation in vertical position thereby obtaining the predicted deviation in vertical position; and generating a throttle command based on the predicted deviation in vertical position. The prediction time span may be chosen appropriately. Five seconds has been found to work well. With such a prediction time span, the method effectively predicts the deviation in vertical position in five seconds time. This mitigates against the slow response time of the throttle(s), and provides a better response in the aircraft's behaviour (e.g. this also helps remove the oscillatory motion described above that can arise when tight vertical position tolerances are followed).

Many different approaches to effecting control of the along-track position may be adopted without departing from the scope of the present invention. For example, the deviation between the actual and desired along-track positions may be monitored and any deviation, no matter how small, may be corrected by an appropriate elevator command. Alternatively, thresholds may be introduced, such that a command to move the elevator(s) arises only when the deviation exceeds a threshold. The threshold may be set quite low relative to the thresholds for the throttle commands to ensure that elevator control is invoked in preference to throttle control. Furthermore, the deviation of the actual along-track position from the desired along-track position may be monitored continuously or at intervals. The intervals may be set as desired.

Issuing elevator commands causes the attitude of the aircraft to change. For example, if the aircraft has been found to have travelled too far along-track, the elevator is used to pitch up the nose of the aircraft thereby decreasing the ground speed of the aircraft and causing the aircraft's progress along-track to slow down. The connection between the deviation in along-track position and elevator command may be implemented in many different ways. For example, commands may be sent to the elevator(s) to alter the pitch of the aircraft by a set increment. Alternatively, an elevator command may arise that causes a change in the pitch of the aircraft that depends on the deviation from the desired along-track position. Another alternative for the connection between along-track position error and elevator command is to generate Calibrated Air Speed (CAS) commands and provide them to the autopilot. The autopilot subsequently generates the necessary elevator commands using the CAS commands. The CAS commands necessary to cancel out along-track position errors can be computed as a function of ground speed error, along-track position error, and current calibrated airspeed (along with additional flight data such as air thermodynamic state and wind data).

In any or the above arrangements, the changes in aircraft configuration arising from the elevator settings and throttle settings may be made with respect to other safety features of the aircraft. For example, any throttle setting may be modified so as to ensure that the airspeed of the aircraft stays within safe or approved limits, for instance to avoid overspeed, underspeed or stall conditions arising. Also, elevator settings may be modified to ensure that the pitch of the aircraft stays within safe or approved limits, for instance to avoid exceeding a stall angle.

A further safety feature may be included. The method may comprise reverting to a vertically constrained flight path should the deviation in vertical position exceed a preset threshold. This may allow a threshold to be set to meet a required navigation performance (RNP) for a continuous approach descent. Should the aircraft exceed this RNP, the above described control law may be abandoned in favour of adopting a vertically constrained flight path (at the expense of predictability and thus usually leading to more significant deviations from the predetermined four-dimensional flight path).

Another embodiment of the present invention may include an aircraft having a flight control computer that is configured to monitor an along-track position and an vertical position of the aircraft relative to corresponding desired positions on the predetermined flight path, use the aircraft's elevators to correct deviations of the along-track position of the aircraft from the desired along-track position, and use the aircraft's throttle to correct deviations of the vertical position of the aircraft from the desired vertical position by altering the throttle setting from a nominal value to an adjusted value when the vertical position differs from the desired vertical position by more than a threshold. The flight control computer may be located in or near the cockpit of the aircraft.

Yet another embodiment of the present invention may include a computer program product for use by a special purpose computing machine, the computer program product containing instructions that when executed cause the computing machine to implement a process method that includes monitoring an along-track position and an vertical position of the aircraft relative to corresponding desired positions on the predetermined fight path, using the aircraft's elevators to correct deviations of the along-track position of the aircraft from the desired along-track position, and using the aircraft's throttle to correct deviations of the vertical position of the aircraft from the desired vertical position by altering the throttle setting from a nominal value to an adjusted value when the vertical position differs from the desired vertical position by more than a threshold.

BRIEF DESCRIPTION OF THE DRAWINGS

In order that the present invention may be more readily understood, preferred embodiments will now be described, by way of example only with reference to the following drawings in which.

DETAILED DESCRIPTION

Figure 1:
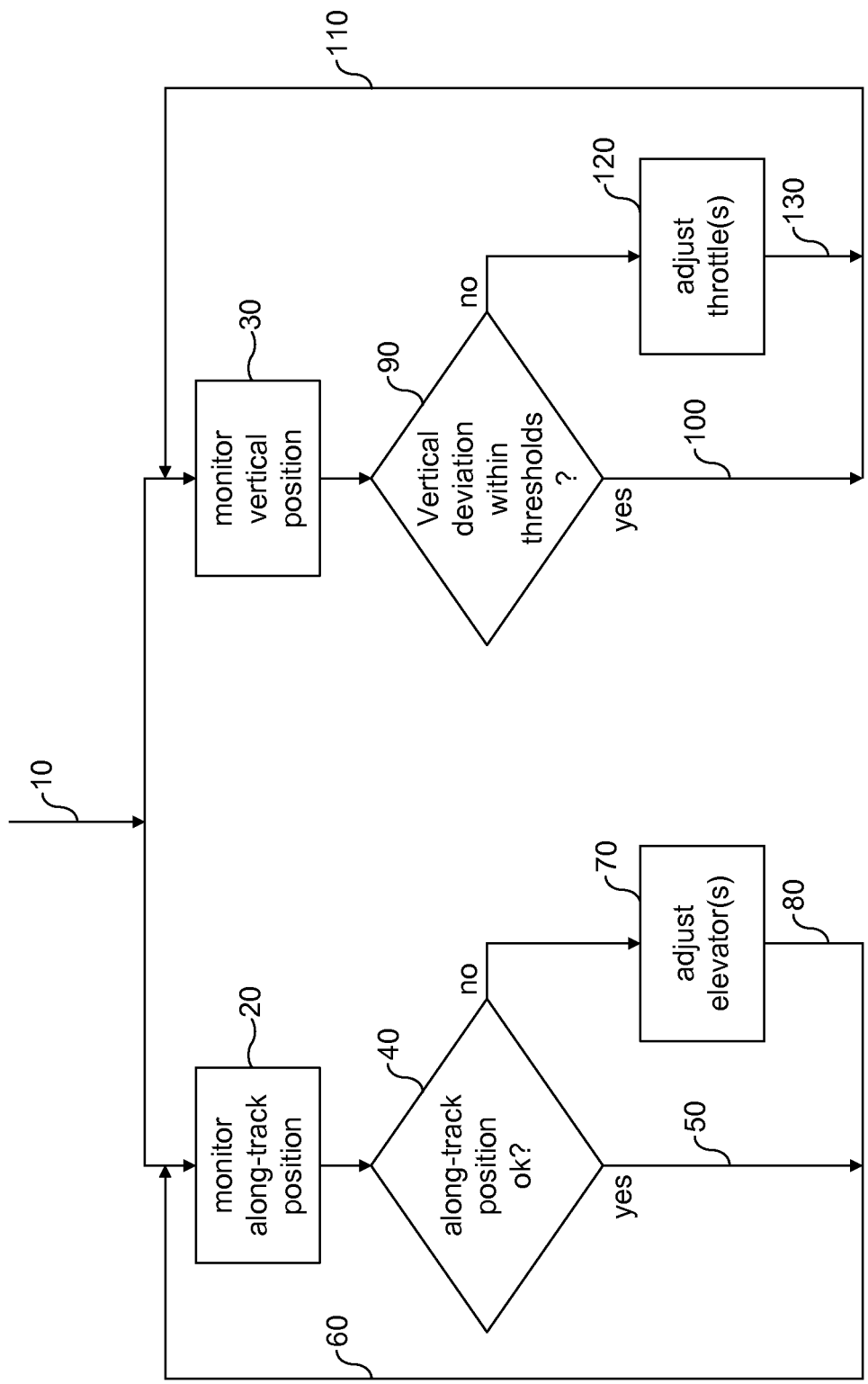
FIG. 1 is a schematic block diagram of a method of controlling the flight path of an aircraft according to a first embodiment of the present invention.

A method of controlling an aircraft to follow a predetermined four-dimensional flight path is shown in FIG. 1. The method begins at 10 and proceeds in parallel to two steps, 20 and 30. This method, and others, may be embodied as a computer program product for use by a special purpose computing machine where the computer program product contains instructions that when executed cause the computing machine to implement the specified process method.

Figure 4A:
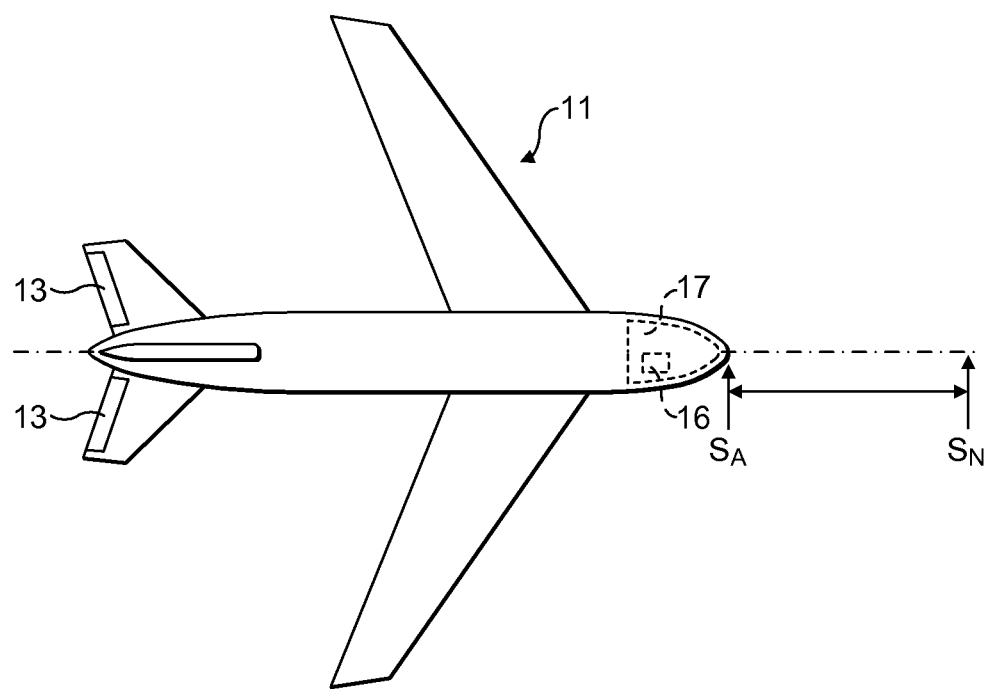
FIG. 4a is a top view of an aircraft illustrating its along-track position.

At 20, the along-track position of the aircraft is monitored. The along-track position of an aircraft 11 is illustrated in FIG. 4a. That is to say, the current position of the aircraft 11 is determined, and its actual along-track position is compared to the desired along-track position for that time to determine the deviation, if any. At 40, this deviation is assessed to determine whether or not it is acceptable. For example, the deviation may be assessed to ensure it falls within accepted tolerance levels. If the along-track position is found to be acceptable, the method continues at 50 where the method returns to monitoring step 20 via leg 60. On the other hand, if the deviation is found not to be acceptable, the method continues to an adjust elevator(s) procedure at 70. At 70, a command is generated to adjust the setting of the elevator(s) 13 so as to correct the deviation. For example, if the aircraft 11 is found to have progressed too far along-track, an elevator command is generated to cause the nose of the aircraft 11 to pitch up. Once the command has been generated, the method continues to the monitoring step 20 via legs 80 and 60, as shown in FIG. 1.

Figure 4B:
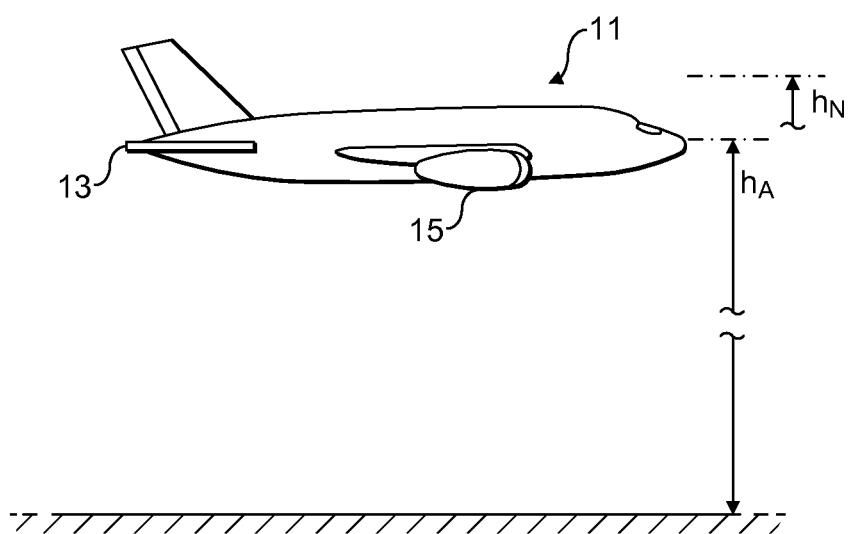
FIG. 4b is a side view of the aircraft illustrating its vertical position.

The vertical position of the aircraft 11 is handled independently as shown to the right hand side of FIG. 1. This is illustrated in FIG. 4b. At 30, the aircraft's vertical position is monitored. That is to say, the current vertical position of the aircraft 11 is determined and compared to the desired vertical position at that time to establish the deviation. At 90, this deviation is assessed to see whether or not it is acceptable. The position may be monitored so that its value is determined every 0.1 seconds, for example. Preferably, the vertical and along-track positions are monitored of the order of once per second.

For example, the deviation is compared to upper and lower limits corresponding to upper and lower thresholds. If the deviation is found to be within the thresholds, the method returns to monitoring step 30 via legs 100 and 110. If on the other hand the deviation is found to be outside a threshold, the method continues to an adjust throttle(s) procedure at 120. The adjust throttle(s) procedure 120 sees the throttle setting adjusted in response to the deviation, to vary the thrust level of the engines 15. For example, if the deviation is found to indicate that the aircraft 11 is too high, the throttle setting is reduced. The response of the aircraft 11 is then monitored and the throttle setting is returned to the nominal setting once the actual vertical position returns to the desired vertical position, as will be described in more detail below. Once the adjust throttle procedure at 120 has completed, the method returns to the monitoring step at 30 via legs 130 and 110.

The schematic block diagrams shown in FIG. 1 and elsewhere represent pseudo-code corresponding to the compiled or interpreted instructions written in a computer language that are provided on a computer program product to be read by a computer. These instructions may be stored on a Compact Disc (CD), a Read Only Memory (ROM), or other suitable memory storage and retrieval media.

Figure 2:
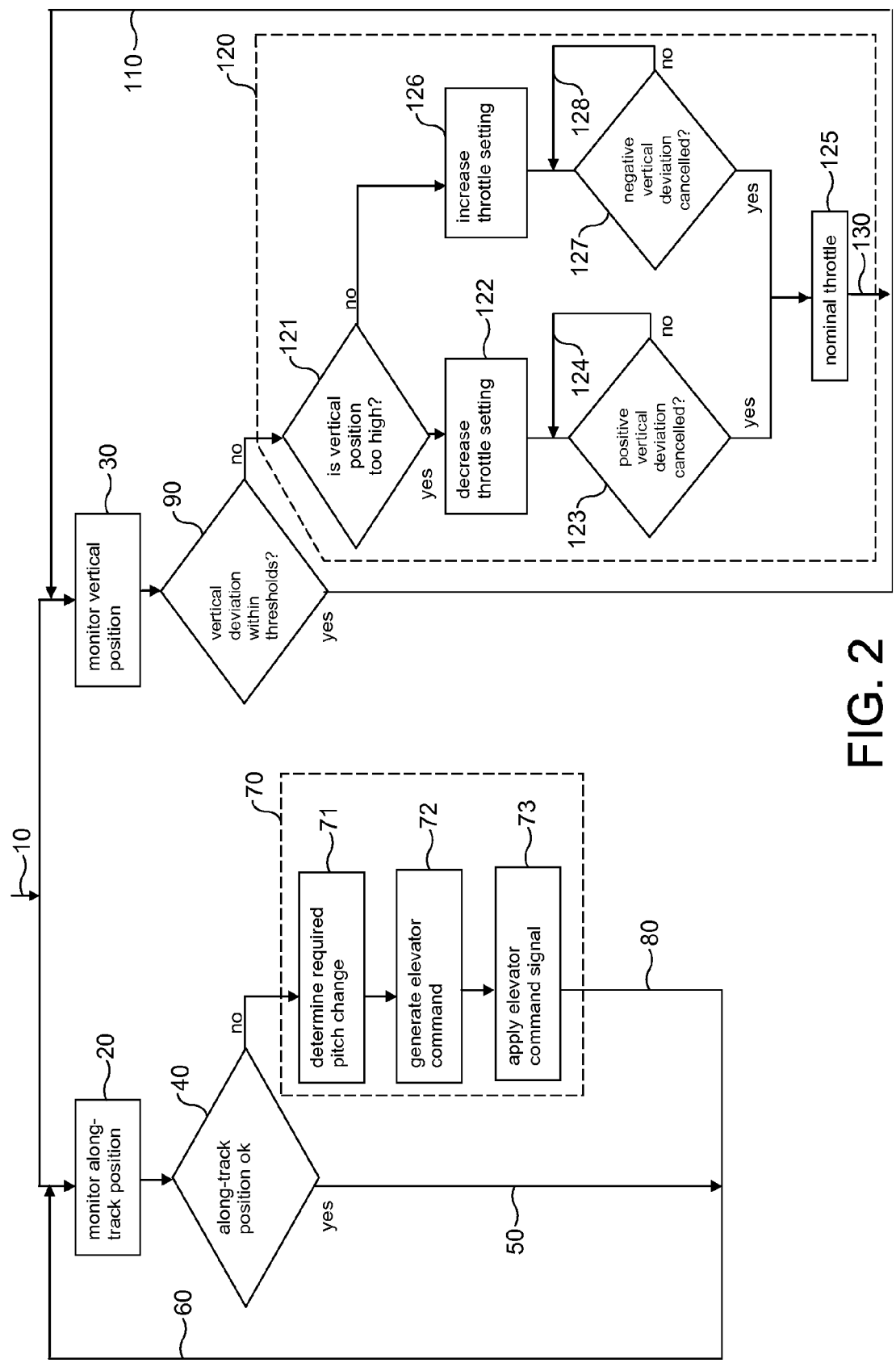
FIG. 2 is a schematic block diagram of a method of controlling the flight path of an aircraft according to a second embodiment of the present invention.

FIG. 2 corresponds broadly to FIG. 1, and like parts are denoted with like reference numerals. In essence, FIG. 2 shows the adjust elevator(s) procedure 70 and the adjust throttle (s) procedure 120 in more detail than FIG. 1.

The adjust elevator(s) procedure 70 starts at 71 where the required pitch change is determined. While the elevator command may be generated in a number of ways, in this preferred embodiment the command is generated to cause an increase or decrease in the aircraft's pitch that depends directly on the deviation in the along-track position. Thus, where a large deviation exists, an elevator command is generated that sees a larger change in the pitch of the aircraft 11 result. Thus, the required change in pitch is determined, for the current deviation in along-track position, using a look-up table, equation, or any other well-known method.

At 72, the required change in pitch angle determined at 71 is used to generate an appropriate elevator command signal. For example, the size of elevator deflection may be calculated. The so-generated elevator command signal is applied at step 73, thereby causing the elevator(s) to deflect and the pitch of the aircraft 11 to change. Ensuring the correct pitch angle is reached may be effected in any number of common ways, such as using a feedback loop to control the elevator deflection. With the aircraft 11 set to the desired pitch attitude, the method proceeds along leg 80 to return to the monitor along track position step at 20.

Turning now to the adjust throttle(s) procedure 120, a determination of whether the vertical, position is too high is made at 121. If the answer is yes, the throttle setting is decreased from the nominal setting to a lower value at 122. If the answer is no, the throttle setting is increased from the nominal setting to a higher value at 126. If the throttle setting has been changed to the lower position, the method continues at 123 where the deviation from the vertical position is determined once more. In this instance, a determination that the positive vertical position error has been removed is required (rather than merely dropping within the thresholds). A practical way to verify is to ask whether the aircraft 11 vertical position deviation returns to zero or negative values. If the aircraft 11 is found still to have a positive deviation in vertical position, the determination of whether the vertical position is acceptable is answered negatively and the method loops back to the determination at 123 by virtue of leg 124. This loop continues until the positive deviation of the vertical position is found to have been cancelled, at which point the method proceeds to step 125 where the throttle setting is returned to the nominal value. With this change made, the method returns to the monitor vertical position step at 30 via leg 130.

If the throttle setting has been changed to the upper position, the method continues at 127 where the deviation from the vertical position is determined once more. In this instance, a determination that the negative vertical position error has been removed is required (rather than merely dropping within the thresholds). A practical way to verify this is to ask whether the aircraft's vertical position deviation returns to zero or positive values. If the aircraft 11 is found still to have a negative deviation in vertical position, the determination of whether the vertical, position is acceptable is answered negatively and the method loops back to the determination at 127 by virtue of leg 128. This loop continues until the negative deviation of the vertical position is found to have been cancelled, in which case the method proceeds to step 125 where the throttle setting is returned to the nominal, value. With this change made, the method returns to the monitor vertical position step at 30 via leg 130.

Figure 3:
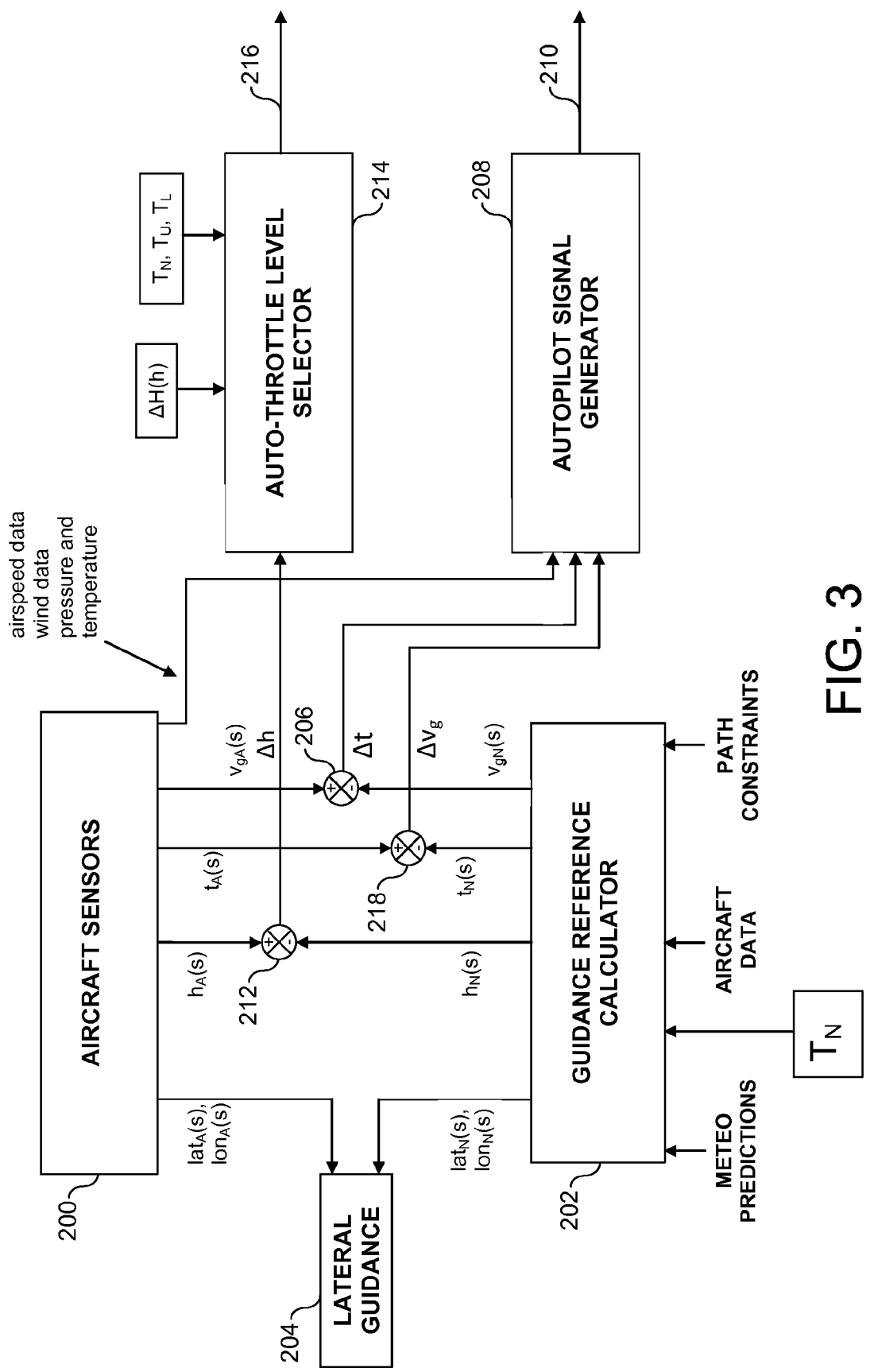
FIG. 3 is a schematic diagram of apparatus operable to control the flight path of an aircraft according to an embodiment of the present invention.

Now that methods of controlling the flight path of an aircraft have been described, systems arranged for putting those methods into effect will be described. FIG. 3 is a schematic representation of one such arrangement. As previously described, the invention may reside in a flight control computer 16 that is programmed to implement any of the methods and may be located in or near a cockpit 17 of the aircraft 11 (see FIG. 4). In this manner, the flight control computer 16 may be a particular embodiment of a special purpose computing machine.

Aircraft sensors provide data indicative of the position and speed of aircraft 11 to aircraft sensors block 200. For example, the sensors may comprise GPS sensors, inertial navigation systems, altimeters, accelerometers, pressure sensors, etc. The data provided by sensors 200 is used by the aircraft sensors block 200 to generate actual positional information signals for use by other parts within the aircraft 11.

In addition, a guidance reference calculator block 202 is used to generate a nominal four-dimensional flight path to be followed by the aircraft 11. In order to calculate the flight path, the guidance reference calculator block 202 receives a number of inputs including, for example, the pilot's intentions, data relating to performance of the aircraft 11, prevailing and predicted meteorological conditions and path constraints. The aircraft data may include weight, and aerodynamic and propulsive performance. Meteorological conditions may include temperature, pressure and wind profiles. Path constraints may include waypoints, speed and altitude constraints and a cost index. These inputs are used to determine the nominal four-dimensional flight path, and thence to provide desired positional information signals for use by other parts of the aircraft 11.

Dealing first with lateral navigation, the aircraft sensors block 200 generates signals indicating the actual latitude $lat_A(s)$ and the actual longitude $lon_A(s)$ for the current point in time. These signals are provided to a lateral navigation block 204 in addition, the guidance reference calculator block 202 generates signals indicating the desired latitude $lat_N(s)$ and the desired longitude $lon_N(s)$ for the current point in time. The lateral navigation block 204 compares the actual latitude and longitude of the aircraft 11 to the desired values, and uses the control surfaces of the aircraft 11 to follow the nominal lateral path in conventional a fashion. Due to the conventional nature of this part of the system, it will not be described further.

Turning now to control of the elevator(s), the arrival time at the current along-track position $t_A(s)$ is generated by the aircraft sensors block 200 and the desired arrival time $t_N(s)$ is generated by the guidance reference calculator block 202, and the actual ground speed $v_{gA}(s)$ is generated by the aircraft sensors block 200 and the desired ground speed $v_{gN}(s)$ is generated by the guidance reference calculator block 202. The differences between the respective actual and desired values are found at subtractors 206 and 218 to produce time error $\Delta t$ and ground speed error $\Delta v_g$ respectively. The error signals $\Delta t$ and $\Delta v_g$ are provided to an autopilot signal generator 208.

The autopilot, signal generator 208 takes the error signals, $\Delta t$ and $\Delta v_g$, and calculates the required change in the aircraft CAS to correct the error. This may be achieved, for example, using a feedback control system that receives time error, ground speed error, and current airspeed as inputs, as well as additional flight data that may be necessary for the calculations such as air thermodynamic state and wind data, and in turn calculates corrections to CAS. With the corrected CAS determined, the autopilot signal generator 208 generates a signal 210 representing this CAS and provides it to the autopilot. Then, in conventional fashion, the autopilot responds to the change in CAS signal 210 by commanding actuations of the elevator until the requested CAS is realised.

The autopilot signal generator may receive the aforementioned errors, or in an alternative embodiment, the autopilot signal generator may receive along-track position errors as a function of time, $\Delta s(t)$, and ground speed errors as a function of time, $\Delta v_g(t)$. Additionally, it may receive CAS, or any other variable that unambiguously determines the current airspeed of the aircraft 11, as well as additional flight data that may be necessary for the calculations such as air thermodynamic state and wind data.

Turning now to the vertical position, the aircraft sensors block 200 provides a signal $h_A(s)$ representing the actual vertical position of the aircraft 11 at the current along-track position and the guidance reference calculator block 202 provides a signal $h_N(s)$ representing the desired vertical position of the aircraft 11 at the current along-track position. These signals are provided to a subtractor 212 that subtracts one from the other to produce a vertical position error signal $\Delta h$. This error signal $\Delta h$ is provided to an auto-throttle level selector 214. The auto-throttle level selector 214 received further inputs corresponding to the threshold value $\Delta H(h)$, the nominal throttle setting $T_N$, and the upper and lower throttle settings $T_U$ and $T_L$.

The auto-throttle level selector 214 compares the magnitude of the error signal $\Delta h$ to the threshold $\Delta H(h)$. If the magnitude of the error signal $\Delta h$ exceeds the threshold $\Delta H(Si)$ and the error signal is positive, this implies that the aircraft 11 is too high and the auto-throttle level selector 214 responds by generating an auto-throttle signal 216 corresponding to the lower throttle setting $T_L$. If the magnitude of the error signal $\Delta h$ exceeds the threshold $\Delta H(h)$ and the error signal is negative, this implies that the aircraft 11 is too low and the auto-throttle level selector 214 responds by generating an auto-throttle signal 216 corresponding to the upper throttle setting $T_U$.

Whenever the auto-throttle level selector 214 is producing either the upper or lower throttle setting $T_U$, $T_L$ as the auto-throttle signal 216, the auto-throttle level selector 214 reverts to monitoring the error signal $\Delta h$ to establish when it reaches zero. Once zero is reached, the auto-throttle signal 216 changes to match the nominal throttle setting $T_N$.

Although not shown, the arrangement of FIG. 3 may include override features to ensure that the safety of the aircraft 11 is not compromised. For example, the auto-throttle signal 216 and the elevator signal 210 may be filtered through a safety block that ensures that the values remain within safe limits. For example, the values may be checked to ensure that the resulting pitch angle remains within safe limits for the aircraft 11 in its current configuration, that the engines remain operating within recommended limits, or that a change in engine thrust and/or a given elevator command will not cause the airspeed of the aircraft 11 to depart from safe limits.

Figure 5:
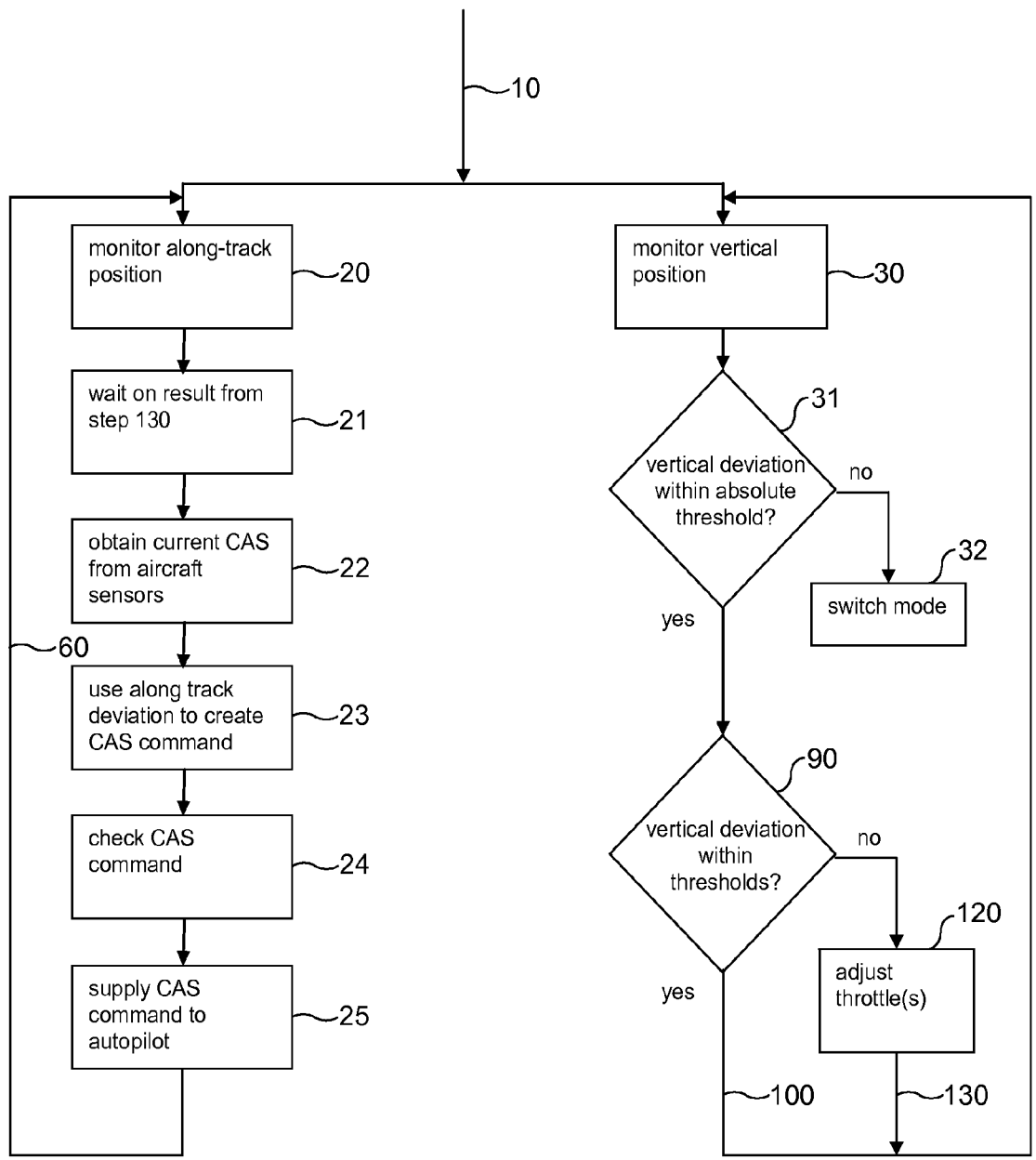
FIG. 5 is a schematic block diagram of a method of controlling the flight path of an aircraft according to a third embodiment of the present invention.
Figure 6:
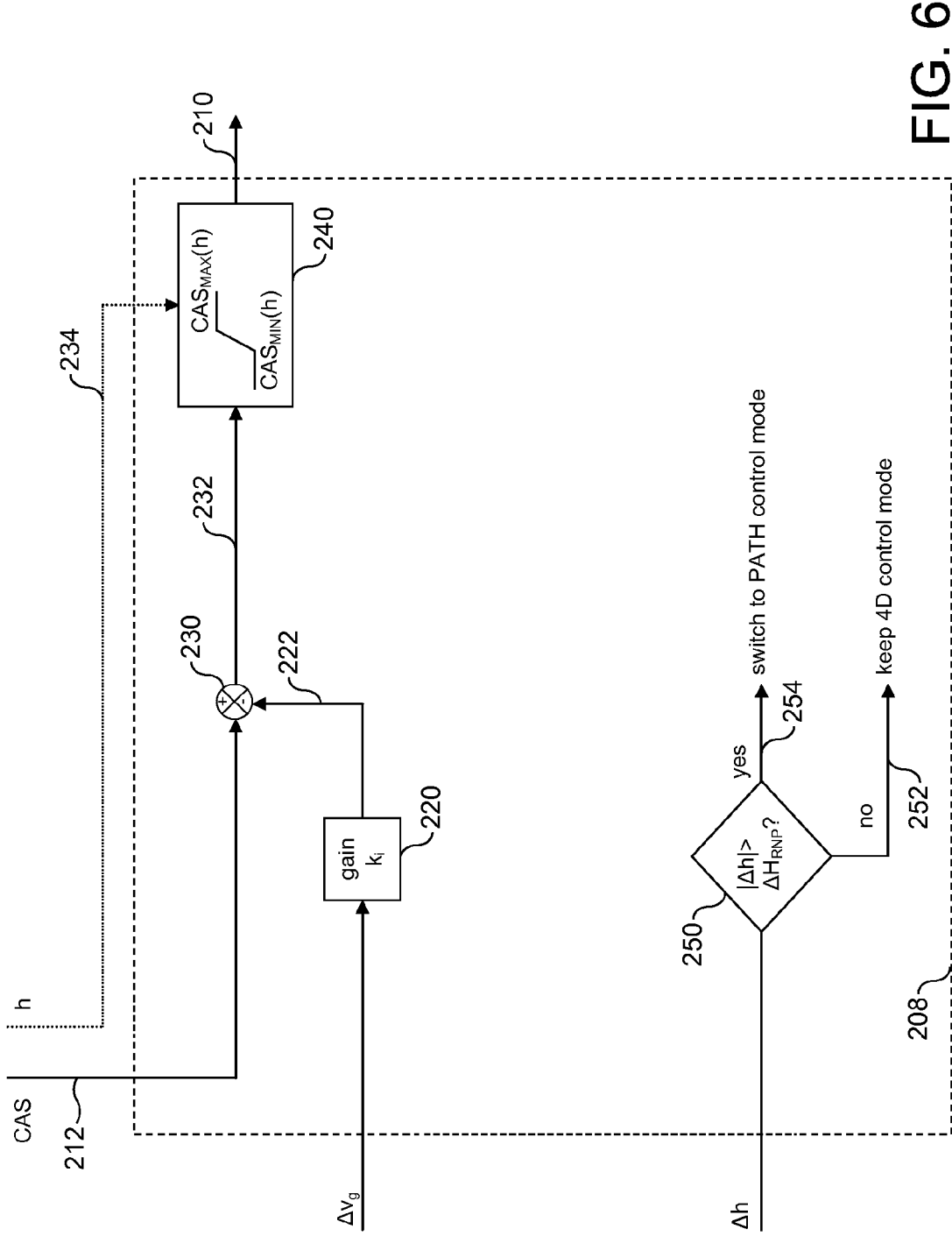
FIG. 6 is a schematic diagram of an autopilot signal generator for use with embodiments of the present invention.

FIG. 5 is adapted from FIG. 1, and common reference numerals indicate common features. Hence, FIG. 5 shows a method of controlling an aircraft 11 to follow a predetermined four-dimensional flight path. The method is modified to include further safety features. FIG. 6 shows an embodiment of the autopilot signal generator 208 of FIG. 3 that includes means for effecting the safety features of FIG. 5.

The method operates in parallel with respect to the considerations of the along-track position and the vertical position. Considering first the vertical position, the vertical position is monitored at step 30 as before. At step 31, the deviation in vertical position is calculated and compared to a maximum deviation threshold. For example, the maximum deviation threshold may be some limit imposed by air traffic control. Typically, the maximum deviation threshold will depend upon the manoeuvre being flown. During a continuous descent approach, the maximum deviation threshold may correspond to an imposed required navigation performance (RNP), which may take a value of 200 feet or so. It is stressed that the maximum deviation threshold is not the same as the throttle-change thresholds described previously. In fact, the throttle-change thresholds should be significantly smaller, e.g. 100 feet, as throttle changes should generally take effect in order to avoid deviations in the vertical position greater than the maximum deviation threshold.

If, at 31, the determination indicates that the deviation in vertical position has grown to be outside the maximum deviation threshold, the current method of flight guidance is terminated, at step 32 where there is a switch mode to another control law, e.g. one with a vertically constrained path. If the determination at 31 finds that the aircraft 11 is still within the maximum deviation threshold, for vertical position deviation, the method continues to step 90. At step 90, the deviation in vertical position is compared with the throttle-change thresholds to determine whether the throttle(s) should be adjusted at 120, as has been described previously.

Turning now to the along-track position consideration, the along-track position is monitored at step 20, as before. Next, a delay is introduced at step 21 (where required) to ensure that the result of the switch mode determination at step 31 is made before the method can continue to step 22.

At step 22, the aircraft's current CAS is obtained from flight data. The aircraft's current CAS is shown at 212 in FIG. 6. At step 23, the deviation in along-track position is calculated and is used to obtain a new CAS command. In this embodiment, a time error $\Delta t$ is used, i.e. how early or late the aircraft 200 reached its current position. To allow tuning of the effect of the along-track position correction on the CAS command, this time error is scaled by multiplier 220 where the time error is multiplied by a gain factor $k_i$. Thus $$\Delta CAS = k_i \Delta t(s).$$

The gain factor $k_i$ is chosen to be small, such as 1 knot of correction per second of time deviation. A gradual elimination of the time deviation results. Stability may be improved, by using a gain factor $k_i$ that is a Laplace operator of the form.

$$k_i = k_{i_0} + (k_p)s.$$

The scaled time error 222 is passed to an adder 230. Adder 230 adds the scaled timer error 222 to the aircraft's current CAS 212 to form a new CAS command 232.

At step 24, the CAS command 232 is checked to ensure it is within desired limits. This is performed by filter 240. Filter 240 compares the CAS command 232 to upper and lower limits $CAS_{MAX}(h)$ and $CAS_{MIN}(h)$. These limits may be chosen as appropriate, and may vary according to the current flying conditions and configuration of the aircraft 200. For example, a general upper limit of 340 knots or Mach. 0.82 (whichever is less) may be used for a given aircraft, reduced to 250 knots when at an altitude of 10000 feet or less (as is required in European skies). A smooth transition may be implemented between these two upper limits that varies linearly with altitude. Additionally, a minimum limit equal to the minimum manoeuvre speed for the current configuration of the aircraft 11 may be set.

The CAS command 232 is left unaltered if it is within these limits. Alternatively, the filter 240 limits the CAS command 232 to whichever limit $CAS_{MAX}(h)$ or $CAS_{MIN}(h)$ is exceeded. The output from filter 240 becomes the CAS command. 210 that is provided to the autopilot, as indicated at step 25. The method then repeats via return path 60.

Thus, the CAS command 210 provided to the autopilot is modified from its original form 212 to reflect the deviation in along-track position. The relative effect of the deviation may be tailored by appropriate choice of the gain factor $k_i$. The method also includes the safety feature of ensuring that the CAS command remains within limits $CAS_{MAX}(h)$ and $CAS_{MIN}(h)$. These limits may reflect the current configuration of the aircraft and the manoeuvre being flown, as is normal for the case of preventing underspeed and overspeed.

FIG. 6 also shows a particular implementation of steps 31 and 32 of FIG. 5. The deviation in vertical position signal $\Delta h$ is provided to a comparator 250 that checks the deviation against a RNP threshold $\Delta H_{RNP}$. As explained previously, the method continues if the deviation in vertical position is within the RNP threshold as indicated at 252, but switches to an alternative mode at 254 if outside of the RNP threshold.

Figure 7:
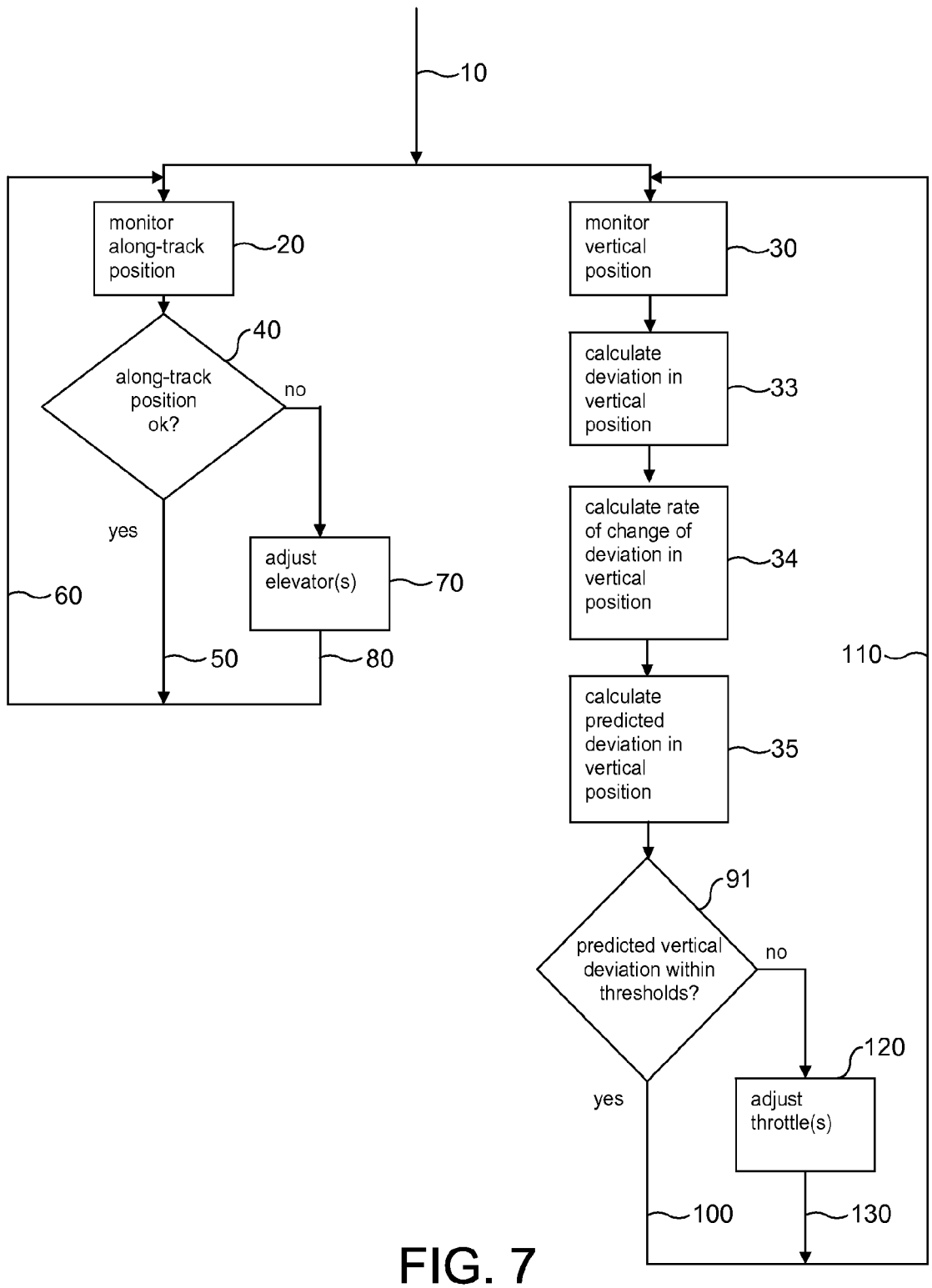
FIG. 7 is a schematic block, diagram of a method of controlling the flight path of an aircraft according to a fourth embodiment of the present invention.

FIG. 7 shows a further embodiment of the method of FIG. 1. Again, like reference numerals indicate like parts. FIG. 7 illustrates an improvement in how the deviation in vertical position is used to adjust the throttle(s). As before, the vertical, position is monitored at step 30. The deviation in vertical position is then calculated at 33. At 34, the rate of change of deviation in vertical position is calculated, i.e. if $\Delta h$ is the deviation, $d\Delta h/dt$ is calculated. At 35, a calculation of a predicted deviation in vertical position is made for a desired time in the future. That is to say, a predicted deviation in vertical position $\Delta h_a$ is calculated from $$\Delta h_a = \Delta h + \tau\left(\frac{d\Delta h}{dt}\right),$$

where $\tau$ is the required prediction time. A prediction time of five seconds has been found to work well.

Then, at step 91 it is the predicted deviation in vertical position that is compared to the change-throttle thresholds to determine if the throttle(s) should be changed at 120. Thus, throttle changes are based on what the deviation in vertical position is expected to be in five seconds time. In this way, better performance is seen as the inevitable delay caused by slow throttle response is anticipated. Thus, the overshoot that would otherwise occur is mitigated. This is particularly advantageous in instances where tight tolerances in vertical position are required. For example, this may be a tight tolerance in the adjust-throttle thresholds, or it may be a tight tolerance in the maximum deviation threshold (that will then require a tight tolerance in the adjust-throttle thresholds). By using such a predictive control law, the number of throttle adjustments may also be reduced.

When using a prediction of deviation in vertical position, it is considered beneficial to compare the actual deviation in vertical position to a maximum deviation threshold, as illustrated as step 130 in FIG. 5, rather than to compare the predicted deviation in vertical position to the maximum deviation threshold.

As noted above, the present invention is particularly beneficial when used with flying continuous descent approaches. In such circumstances, the present invention provides improved certainty of the position of the aircraft 11 at any particular point in time. An allowance that must be made is that the nominal throttle setting must be set to be above the idle thrust of the engines to ensure that a lower throttle setting is available to correct deviations above the desired vertical, position.

As an example of a suitable threshold to apply when monitoring vertical position 100 feet has been found to provide a good compromise between accuracy of position while avoiding too frequent changes to the throttle setting. With a threshold of 100 feet above and below the desired vertical position, it has been found that continuous descent approaches may be flown with typically only a few changes to the throttle setting.

It will be clear to the skilled person that variations may be made to the above embodiments without necessarily departing from the scope of the invention that is defined by the appended claims.

For example, the method of FIG. 5 and the arrangement of FIG. 6 may be modified to improve stability. The CAS command 232 may be modified by adding a factor dependent upon the deviation in ground speed. Hence, the method may include a further step between steps 23 and 24 where a modified-CAS command is created, with the modified CAS command being checked at step 24. FIG. 6 may be adapted to receive an input corresponding to $\Delta v_g$, the deviation in ground speed. This input may be converted to an equivalent error in air speed. The deviation may then be scaled by a gain factor $k_c$. A gain factor of unity has been found to work well, such that the deviation in calibrated airspeed is equal to but of opposite sign to the deviation in ground speed. The scaled deviation in calibrated airspeed may be passed to a subtractor where it is subtracted from the CAS command 232 to form the modified CAS command that is passed to the filter 240. The filter 240 may the process the modified CAS command as described previously.

The invention claimed is:

1. A method of controlling an aircraft to follow a predetermined four-dimensional flight path, the method comprising:

monitoring a vertical position of the aircraft relative to a desired vertical position on the predetermined flight path;

calculating a deviation in the vertical position of the aircraft from the desired vertical position;

correcting the deviation in the vertical position by adjusting a throttle setting of the aircraft from a nominal value to an adjusted value;
wherein adjusting the throttle setting comprises,
calculating a rate of change of the deviation in the vertical position,
determining a predicted deviation in the vertical position based on the rate of change, and
comparing the predicted deviation in the vertical position to the adjusted value of the throttle setting to determine if the adjusted value of the throttle setting should be changed.

2. The method of claim 1, wherein correcting the deviation is performed when the vertical position differs from the desired vertical position by more than a threshold, said threshold being dependent upon the altitude of the aircraft.

3. The method of claim 2, further comprising using a threshold that varies such that it increases with increasing altitude.

4. The method of claim 1, wherein correcting the deviation in the vertical position of the aircraft comprises:
increasing the throttle setting from a nominal value to a higher value when the vertical position falls below the desired vertical position by a first threshold, and
decreasing the throttle setting from the nominal value to a lower value when the vertical position rises above the desired vertical position by a second threshold.

5. The method of claim 1, further comprising,
after adjusting the throttle setting and while the throttle setting is at the adjusted higher or lower value, continuing to monitor the vertical position of the aircraft relative to the desired vertical position on the predetermined flight path; and
returning the throttle setting to the nominal value once the vertical position of the aircraft corresponds to the desired vertical position.

6. The method of claim 5, wherein the higher and lower values of the throttle setting are offset from the nominal value by an equal amount.

7. The method of claim 1, comprising calculating the necessary adjusted value of the throttle setting to achieve the desired vertical position.

8. The method of claim 1, comprising repeatedly calculating a predicted deviation in vertical position by: calculating the current deviation of actual vertical position from the desired vertical position, calculating the rate of change of the deviation in vertical position, multiplying the rate of change by a prediction time span, and adding the so-multiplied rate of change to the current deviation in vertical position thereby obtaining the predicted deviation in vertical position.

9. The method of claim 1, further comprising monitoring an along-track position of the aircraft relative to a desired along-track position on the predetermined flight path;
generating throttle commands based upon deviations of the actual vertical position of the aircraft from the desired vertical position of the aircraft;
generating elevator commands based upon deviations of the actual along-track position of the aircraft from the desired along-track position of the aircraft.

10. The method of claim 9, further comprising supplying an autopilot with calibrated airspeed controls to generate the elevator commands.

11. An aircraft, comprising:
a flight control computer configured to:
monitor a vertical position of the aircraft relative to a desired vertical position on a predetermined flight path;
calculate a deviation in the vertical position of the aircraft from the desired vertical position;
adjusting a throttle setting of the aircraft to correct the deviation by altering a throttle setting of the aircraft from a nominal value to an adjusted value;
wherein the flight computer is configured to adjust the throttle setting by being configured to
calculate a rate of change of the deviation in the vertical position,
determine a predicted deviation in the vertical position based on the rate of change, and
compare the predicted deviation in the vertical position to the adjusted value of the throttle setting to determine if the adjusted value of the throttle setting should be changed.

12. The aircraft of claim 11, wherein the flight control computer is further configured to adjusting the throttle setting of the aircraft by altering the throttle setting from a nominal value to an adjusted value when the vertical position differs from the desired vertical position by more than a threshold, said threshold that is dependent upon the altitude of the aircraft.

13. The aircraft of claim 12, wherein the flight control computer is further configured to use a threshold that varies such that it increases with increasing altitude.

14. The aircraft of claim 11, wherein adjusting a throttle setting of the aircraft includes the flight control computer being configured to one of:
increase the throttle setting from a nominal value to a higher value when the vertical position falls below the desired vertical position by a first threshold, and
decrease the throttle setting from the nominal value to a lower value when the vertical position rises above the desired vertical position by a second threshold.

15. The aircraft of claim 11, wherein after adjusting the throttle setting and while the throttle setting is at the adjusted higher or lower value the flight control computer is further configured to:
continue to monitor the vertical position of the aircraft relative to the desired vertical position on the predetermined flight path; and
return the throttle setting to the nominal value once the vertical position of the aircraft corresponds to the desired vertical position.

16. The aircraft of claim 11, wherein the higher and lower values of the throttle setting are offset from the nominal value by an equal amount.

17. The aircraft of claim 11, wherein the flight control computer is further configured to calculate the necessary adjusted value of the throttle setting to achieve the desired vertical position.

18. The aircraft of claim 11, wherein said flight computer is further configured to:
monitor an along-track position of the aircraft relative to a desired along-track position on the predetermined flight path;
generate throttle commands based upon deviations of the actual vertical position of the aircraft from the desired vertical position of the aircraft;
generate elevator commands based upon deviations of the actual along-track position of the aircraft from the desired along-track position of the aircraft.

19. The aircraft of claim 18, wherein the flight control computer is further configured to supply an autopilot with calibrated airspeed controls to generate the elevator commands.

* * * * *